United States Patent
Pelleg et al.

(10) Patent No.: US 10,489,712 B2
(45) Date of Patent: Nov. 26, 2019

(54) QUALITY-BASED SCORING AND INHIBITING OF USER-GENERATED CONTENT

(71) Applicant: Yahoo Holdings, Inc., Sunnyvale, CA (US)

(72) Inventors: Dan Pelleg, Haifa (IL); Oleg Rokhlenko, Haaifa (IL); Idan Szpektor, Kfar Saba (IL); Yuval David Pinter, Binyamina-Givat Ada (IL); David Carmel, Haifa (IL); Somesh Jain, Santa Clara, CA (US); Archit Shrivastava, Bangalore (IN); Shirin Oskooi, San Francisco, CA (US)

(73) Assignee: Oath Inc., New York, NY (US)

( * ) Notice: Subject to any disclaimer, the term of this patent is extended or adjusted under 35 U.S.C. 154(b) by 943 days.

(21) Appl. No.: 15/055,220

(22) Filed: Feb. 26, 2016

(65) Prior Publication Data

US 2017/0249311 A1    Aug. 31, 2017

(51) Int. Cl.
G06F 17/30 (2006.01)
G06N 5/04 (2006.01)

(52) U.S. Cl.
CPC ..................... G06N 5/04 (2013.01)

(58) Field of Classification Search
None
See application file for complete search history.

(56) References Cited

U.S. PATENT DOCUMENTS

| | | | |
|---|---|---|---|
| 8,280,881 B1* | 10/2012 | Zhou | G06F 16/50 707/728 |
| 2008/0077570 A1* | 3/2008 | Tang | G06F 16/3344 |
| 2008/0168059 A1* | 7/2008 | Hoashi | G06F 16/683 |
| 2010/0132036 A1* | 5/2010 | Hadjieleftheriou | G06F 21/6227 726/22 |
| 2010/0325133 A1* | 12/2010 | Rounthwaite | G06F 16/951 707/759 |
| 2011/0317923 A1* | 12/2011 | Hondo | G06F 16/335 382/190 |
| 2012/0051628 A1* | 3/2012 | Noguchi | G06F 16/5854 382/159 |
| 2014/0141401 A1* | 5/2014 | Agarwal | G09B 19/00 434/359 |
| 2014/0244631 A1* | 8/2014 | Arthur | G06F 17/2785 707/723 |
| 2016/0232160 A1* | 8/2016 | Buhrmann | G06F 17/2247 |
| 2016/0358094 A1* | 12/2016 | Fan | G06N 7/005 |
| 2017/0046428 A1* | 2/2017 | Takase | G06F 16/374 |

\* cited by examiner

*Primary Examiner* — Hung D Le
(74) *Attorney, Agent, or Firm* — Cooper Legal Group, LLC

(57) ABSTRACT

Methods and devices for assessing the quality of user-generated content are described. In one embodiment, a method is disclosed for measuring the quality of a user-generated answer to a question by combining various factors, including question-answer surface word vector similarity, question-answer explicit semantic analysis vector similarity, answer-answer explicit sematic analysis vector similarity, query performance predictor, sentiment analysis, textual analysis of the answer, and reputation of the answerer. The method uses a learning procedure to determine the best algorithm for measuring the overall quality of the answer based on these factors.

20 Claims, 10 Drawing Sheets

Process 412

Process 416

QUALITY-BASED SCORING AND INHIBITING OF USER-GENERATED CONTENT

BACKGROUND

Quality of User Generated Content (UGC) in internet sites such as forums and community question-answering (CQA) sites is traditionally measured by user voting or crowd filtering. The UGC contents may be presented to a user in an order determined by the quality measure based on user voting. However, user voting alone may be biased in many ways and thus may not represent an accurate and objective measure of average user preference.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION

Figure 1:
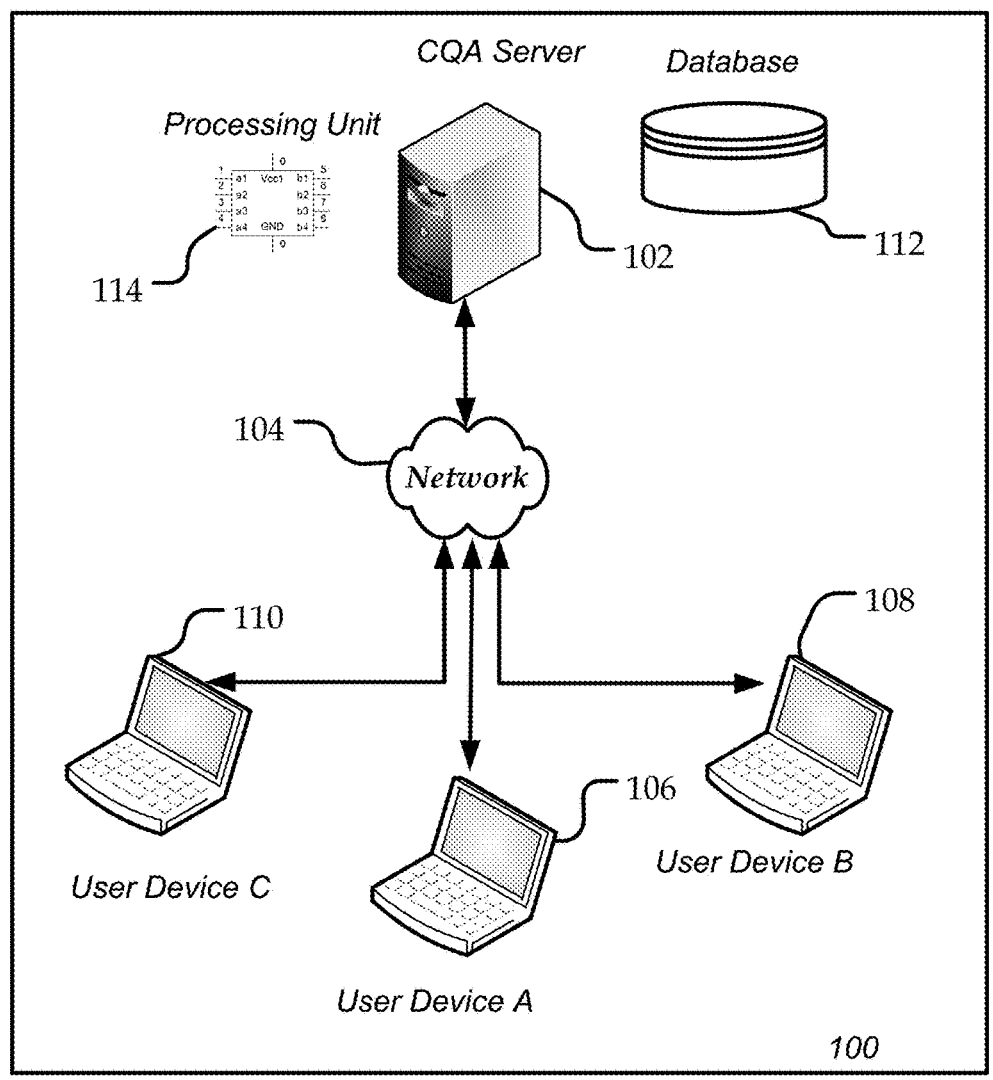
FIG. 1 shows an exemplary embodiment of a CQA system.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

By way of introduction, User Generated Content (UGC) has become prevalent for many internet service platforms. In contrast to the model where content is authored by a select few users or authors and curated by even fewer users or authors, the UGC model allows any user to author content, and often to also express opinions on other users' contributions. However, the quality of the content varies. In many cases, this open model leads to proliferation of low-quality content, as judged by an average usefulness to the consumers of the content. This issue is brought to the forefront by web search engines, which aggressively index UGC content, such as forums and community question-answering (CQA) sites, and often surface poor content items to searchers. Content quality filtering thus becomes especially critical, particularly in situation where the volume of information is virtually unbounded. This may be the case in many internet contexts.

The most common solution to the quality problem is to let the crowd (the users or consumers of the content) help ranking and filter the content. Variety of user rating mechanisms may be employed, with the most popular being a binary approval or disapproval selection by users. Typically, a voting model enables users to endorse (up-vote), and sometimes vote against (down-vote) pieces of content. This is complemented by a common user interface for viewing the content ranked by votes already given and promoting the content liked best by the crowd.

However, the most popular, or the most highly voted content by the crowd, is not necessarily the best one to show to other users. One issue is the subjectivity of the voters. Another issue is voting sparsity—many posts will never be voted on, while others will be voted on sparsely and for reasons that do not align with the needs of users searching for information relating to this content. As a result, algorithmic approaches rather than the conventional crowd filtering approach to quality assessment of UGC have been proposed. Algorithmic approaches use a combination of social, semantic, and syntactic signals to score contributions in CQA, and other similar user-generated content sites.

FIG. 1 shows an exemplary content service system 100. The system includes a content server 102 connected to a network 104. Client devices 106, 108, 110 may be configured to send and receive data from the content server 102 via the network 104. In the exemplary embodiment of FIG. 1, the content service system 100 further include a database 112 remote to the content server 102.

The content server 102 may include a device such as a processing unit 114 that is configured to provide content via the network 104 to client devices 106-110. A content server may, for example, host a site, such as a CQA site (as designated as an example in FIG. 1), a social networking site, examples of which may include, without limitation, Yahoo! Answers, Flicker, Twitter, Facebook, LinkedIn, or a personal user site (such as a blog, vlog, online dating site, etc.). The content server 102 may also host a variety of other sites, including, but not limited to business sites, educational sites, dictionary sites, encyclopedia sites, wikis, financial sites, government sites, etc. The content server 102 may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of devices that may operate as a content server include desktop computers, multiprocessor systems, microprocessor-type or programmable consumer electronics, etc.

The content server 102 may provide a user interface for creating user generated content. In the example of a CQA content server, a user interface may be provided for any user to post a question and any user to contribute answers to the question. The content server 102 may maintain an internal database or alternatively be connected to the remote database, 112, for storing user generated contents. The user generated contents may then be processed and provided by the processing unit 114 of the content server 102 to user upon request, again, via a user interface provided by the content server 102. The user interface for posting questions and the user interface for showing the answers may be one integrated user interface. The quality of the content may be automatically evaluated by the content server 102. In the example of a CQA server, quality of answers to questions may be automatically determined by the CQA server following the approach described below. The answers may be ranked based on the quality evaluation and presented to the requesting user.

Client devices 106-108 may each include a computing device capable of sending or receiving signals via the network 104. A client device such as client devices 106-108 may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A client device such as client devices 106-108 may vary in terms of capabilities or features. Such a device may include or may execute a variety of operating systems, including a personal computer operating system, such as a Windows, iOS or Linux, or a mobile operating system, such as iOS, Android, or Windows Mobile, or the like. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The network 104 provides communications paths between the content server and client devices. The network may include the Internet, one or more local area networks (LANs), one or more wide area networks (WANs), wire-line type connections, wireless type connections, or any combination thereof. Physical communication link or channel of the network may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art.

Figure 2:
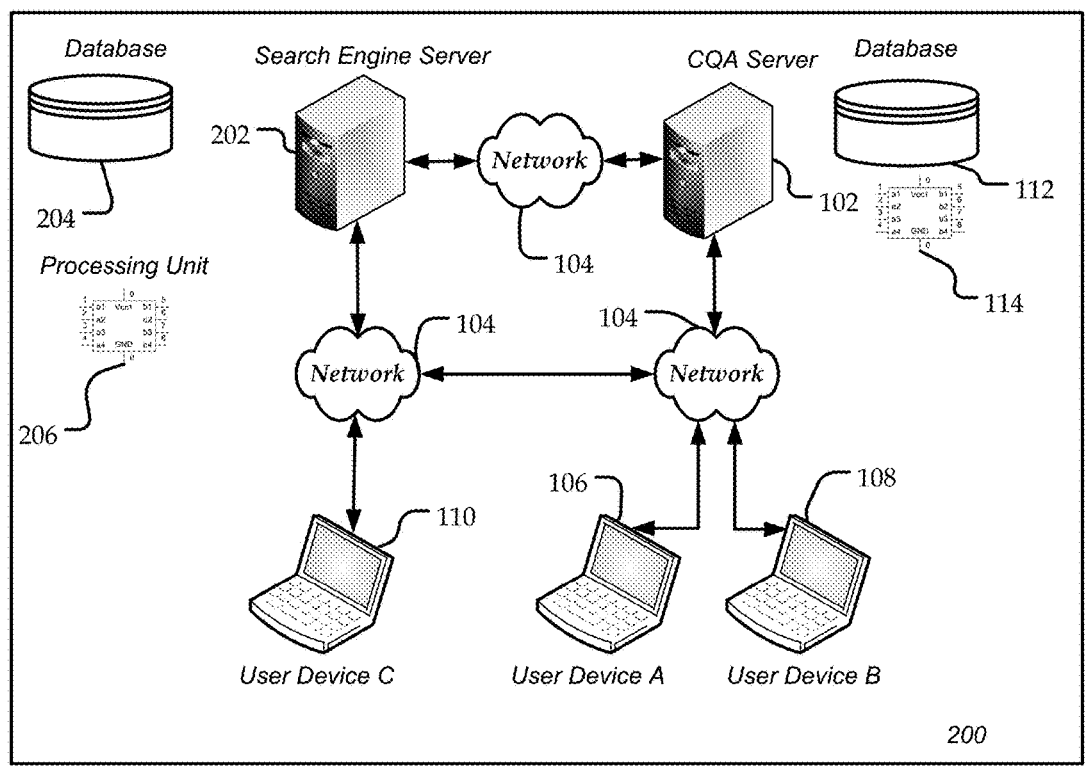
FIG. 2 shows another embodiment of a CQA system.

FIG. 2 shows another embodiment of a content service system 200 using CQA service as an example. In the exemplary embodiment, the content service system 200 includes a CQA server 102 in data communication with network 104 and user devices 106 and 108. The CQA server 102 may include, for example, processing unit 114. The content service system 200 may further include a database 112 operative to store and retrieve data used by the CQA server 102. In the embodiment of FIG. 2, the content service system 200 further includes a search engine server 202 in data communication with network 104, a user device 110 and a database 204. The search engine server in this embodiment may also include a processing unit 206.

In the content service system 200, the CQA server 102 provide a user interface for users to create content (e.g., post questions, and answers) via user client devices 106 and 108. The user-generated content may be maintained by either a local or remote database of the CQA server, such as the database 112 User devices may request answers to a question by querying a search engine hosted in search engine server 202. The search engine server 202 may regularly index various internet content and maintain the indexes in its local database or the remote database 204. The search engine server 202 thus may index the question-answer content of the CQA server 102 and provide it to a user when responding to a search query asking for answer to a question from user device 110. The search engine server 202 may rank the answers from the CQA server and provide the user device either a list of answers based on a quality of the answers or simply provide the user with the best answer. The quality of the answers and the best answer (the answer with the best quality) are determined automatically by the search engine server 202 according to detailed description below.

Figure 3:
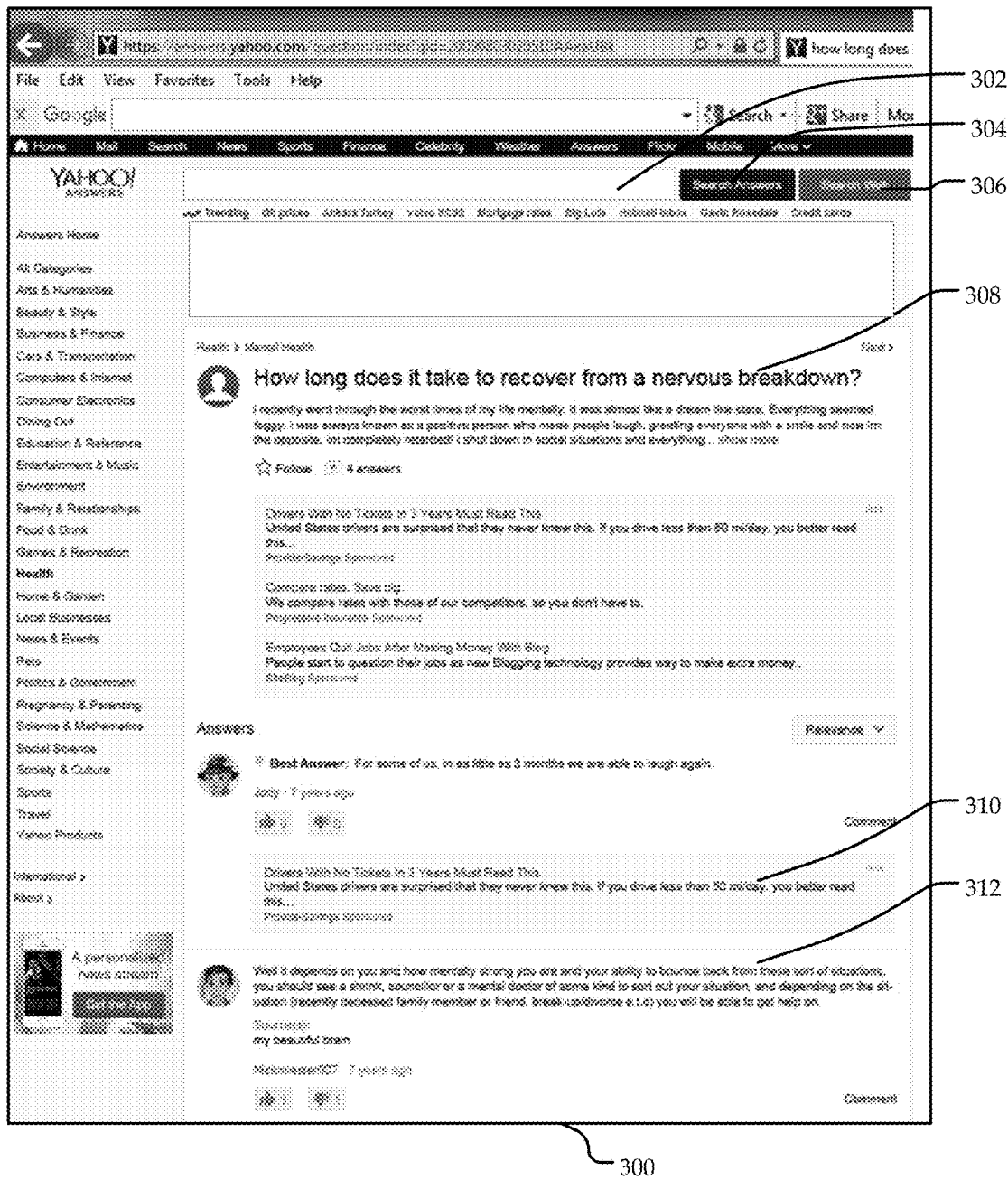
FIG. 3 shows an exemplary CQA user interface.

A user interface may be provided by either the CQA server 102 or the search engine server 202 for showing answers of questions on user device. FIG. 3 shows an example webpage 300 implemented by Yahoo! Answers. The webpage 300 includes an box 302, a button 304, a search button 306 and a response section 308. The box 302 is adapted to receive text input from a user or a user's device. Clicking the button 304, such as by activating the button with a mouse or on a device's touch screen, causes a query defined by the text in the box 302 to be submitted for evaluation by an online query system such as Yahoo! Answers. The online query system maintains questions submitted by users and answers submitted in response to the questions by other users. Selected answers will be provided by the online query system in response to the query. Users may alternatively click the button 306 to instruct the online query system to search the internet for answers rather than to retrieve the stored answers of the online query system. The online query system returns ranked answers to the user in order of relevance by default in the response section 308, showing the best answer 310 first followed by other answers 312.

The CQA server or the search engine server may take into consideration many perspectives in ranking the quality of answers to a particular question. The servers may evaluate each perspective in a separate process to arrive at a measure of quality for each answer with respect to that particular perspective and then weigh the perspectives to arrive at an overall measure of quality for the answer.

Figure 4:
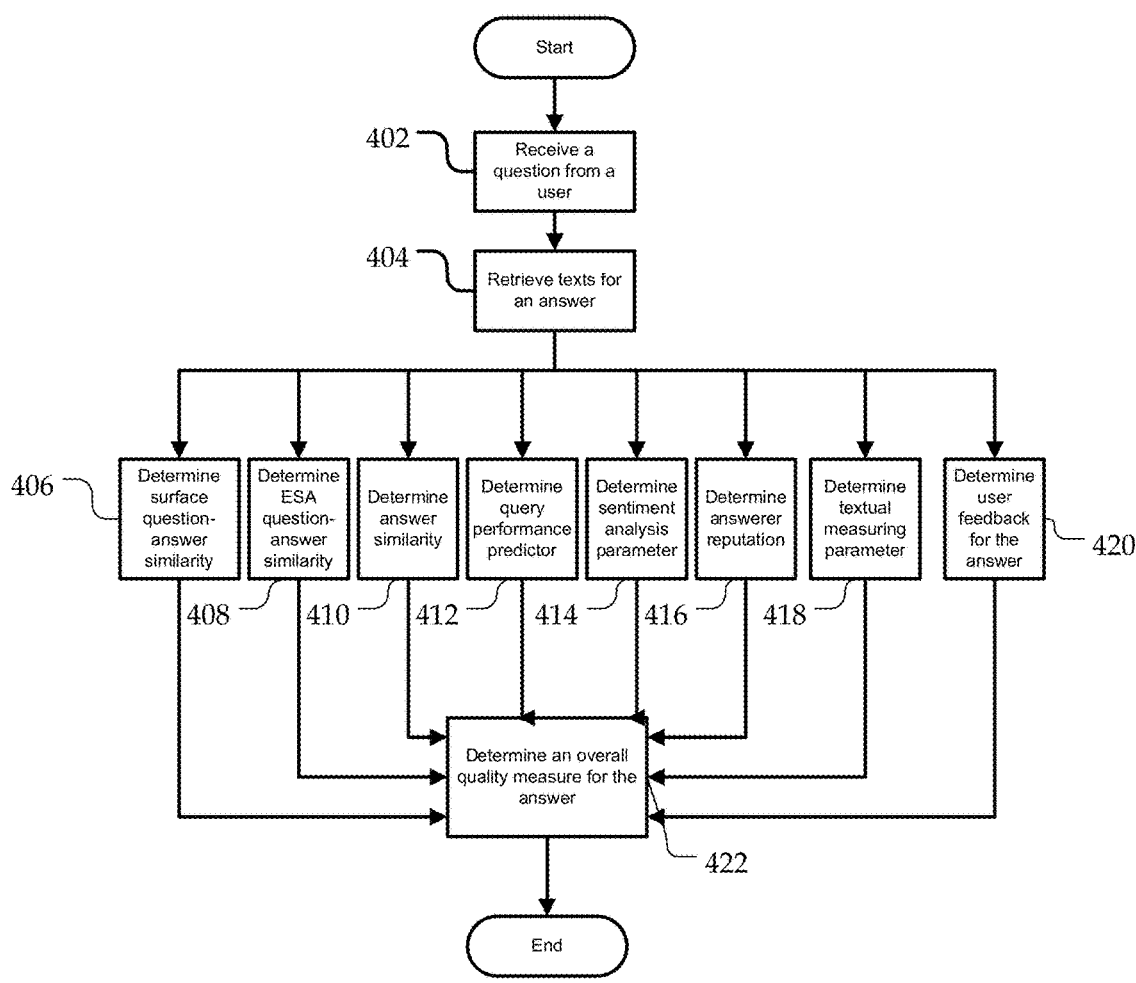
FIG. 4 illustrates a flow chart for determining the quality of a answer to a question.

One embodiment is shown in FIG. 4, FIG. 4 illustrates a method for determining the quality of a answer to a question. A server, such as a content server described above in conjunction with FIG. 1 or FIG. 2, receives a question from the user at block 402 and retrieves the text for an answer in block 404. The answer text is evaluated and scored by multiple processes such as block 406, block 408, block 410, block 412, block 414, block 416, block 418, and block 420. Each process is designed to measure the quality of the answer from a different perspective. As will be discussed later, these different perspectives may have little correlation and thus they may be advantageously combined in block 422 to provide an overall weighted measure of the quality of the particular answer to the question. Those of ordinary skill in the art will understand that these exemplary perspectives and the corresponding processes shown in FIG. 4 are not intended to be limiting. Other perspectives and processes may be considered in the overall quality score evaluation. Those of ordinary skill in the art will further understand that the extent to which various perspectives are non-correlated or normal to each other may be difficult to predict theoretically. The weight of each of these perspectives in evaluating the overall quality of an answer may depend on the correlation between these perspectives and the correlation may be obtained experimentally, as will be described in more detail below. The relative weight may be obtained through an iterative learning process. Once the relative weight is empirically determined, it may then be used for computing an overall quality measure of the answer. In some other embodiments, the processes 406 to 420 and other processes may be inter-related and their execution combination may be correspondingly arranged to reflect their inter-relationship.

Figure 5:
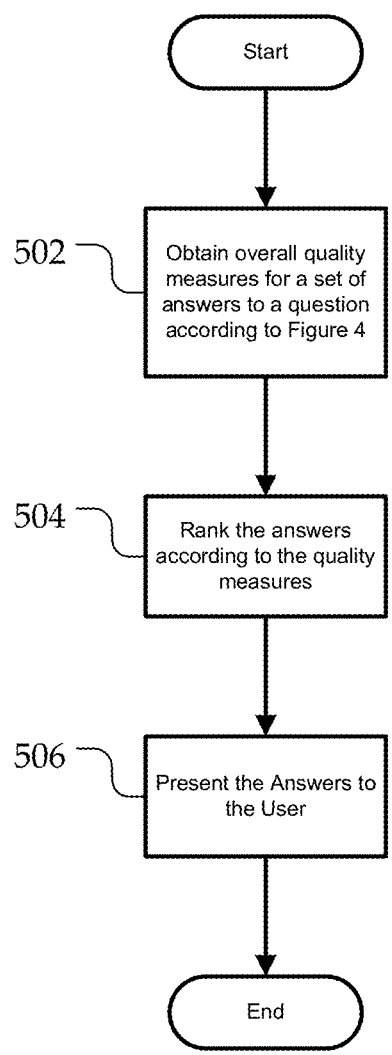
FIG. 5 shows a flow chart of ranking answers to a question and presenting the answers to the users.

FIG. 4 shows the quality determination of an individual answer to a question. FIG. 5 shows a flow chart of ranking answers to a question and presenting the answers to the users. As shown by block 502 of FIG. 5, overall quality measures for all or a subset of answers available in the CQA server and database to the question may be determined under the principles of FIG. 4. These answers to a question may then be ranked based on the overall quality measure for each answer in block 504 and may be presented to the requesting user on via a user interface in an order based on the relative overall quality measures between the answers, as shown by block 506.

Figure 6:
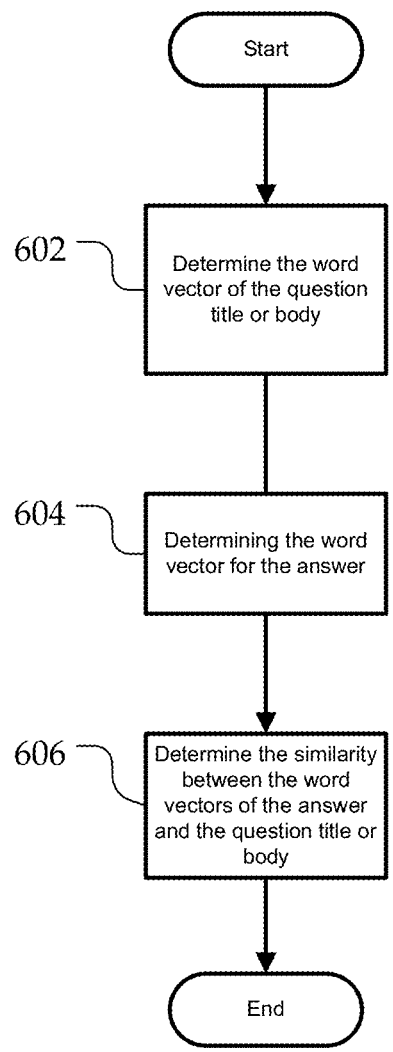
FIG. 6 shows a flow chart for determining answer-question surface work similarity.

Referring again to FIG. 4, in the process indicated by block 406, a surface word question-answer similarity is determined as one perspective for measuring the quality of an answer to the question. Specifically, the similarity of the answer text to the question text may indicate its relevance to the question and is thus a signal for higher quality. FIG. 6 further shows an exemplary embodiment of the process illustrated in block 406 for determining the surface word-question similarity. The word vector of the question is determined in block 602. Similarly, the word vector of the answer text is determined in block 604. As a basic surface textual similarity, cosine between the word vectors of the answer and the question is determined in block 606 as one of the quality measures for the answer. When determining the word vector for the answer text or the question text, the weight of each word may be its tf-idf score, and stems instead of words may be maintained (using Lucene's Porter stemmer, for example). In an alternative to the embodiment of FIG. 6, two surface word vector similarity values may be determined, one between the answer and question title, and the other between the answer and the question body. The two surface word vector similarities may then be weighed to obtain a single surface word question-answer similarity as the first quality measure for the answer.

Referring again to FIG. 4, in the process indicated by block 408, Explicit Semantic Analysis-based (ESA-based) question-answer similarity is determined as a second measure of the quality of the answer. ESA is a vectorial representation of text (individual words or entire documents) that uses a document corpus as a knowledge base. Specifically, in ESA, a word is represented as a column vector in the tf-idf matrix of the text corpus and a document (string of words) is represented as the centroid of the vectors representing its words. Typically, the text corpus is Wikipedia, though other corpora including the Open Directory Project may be used.

Figure 7:
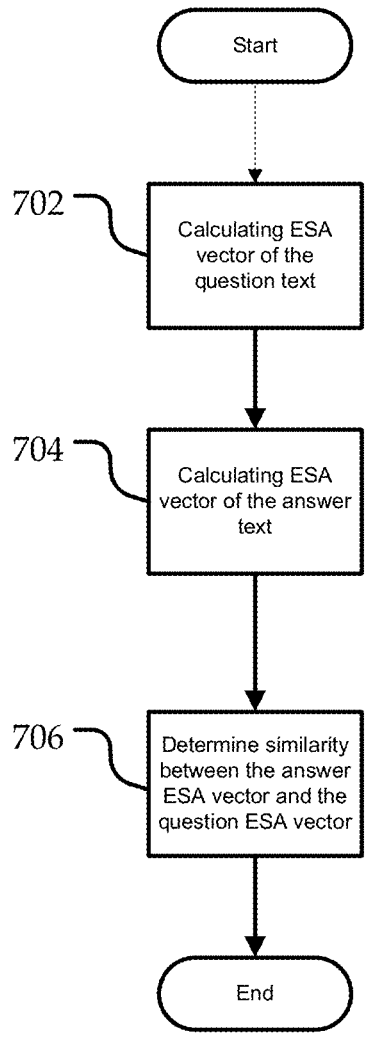
FIG. 7 shows a flow chart for determining answer-question ESA similarity.

FIG. 7 shows an exemplary embodiment of box 408 for determining ESA question-answer similarity. Specifically, since question and answer languages may differ, answers with low surface word similarity to the question may still be of high quality to an average user. To overcome this difference in wording, each text may be represented by its ESA vector calculated in block 702 for the question text and in block 704 for the answer text. The cosine similarity between the ESA vectors of the answer and the question may then be determined in block 706 as the second measure of the quality of the answer.

Figure 8:
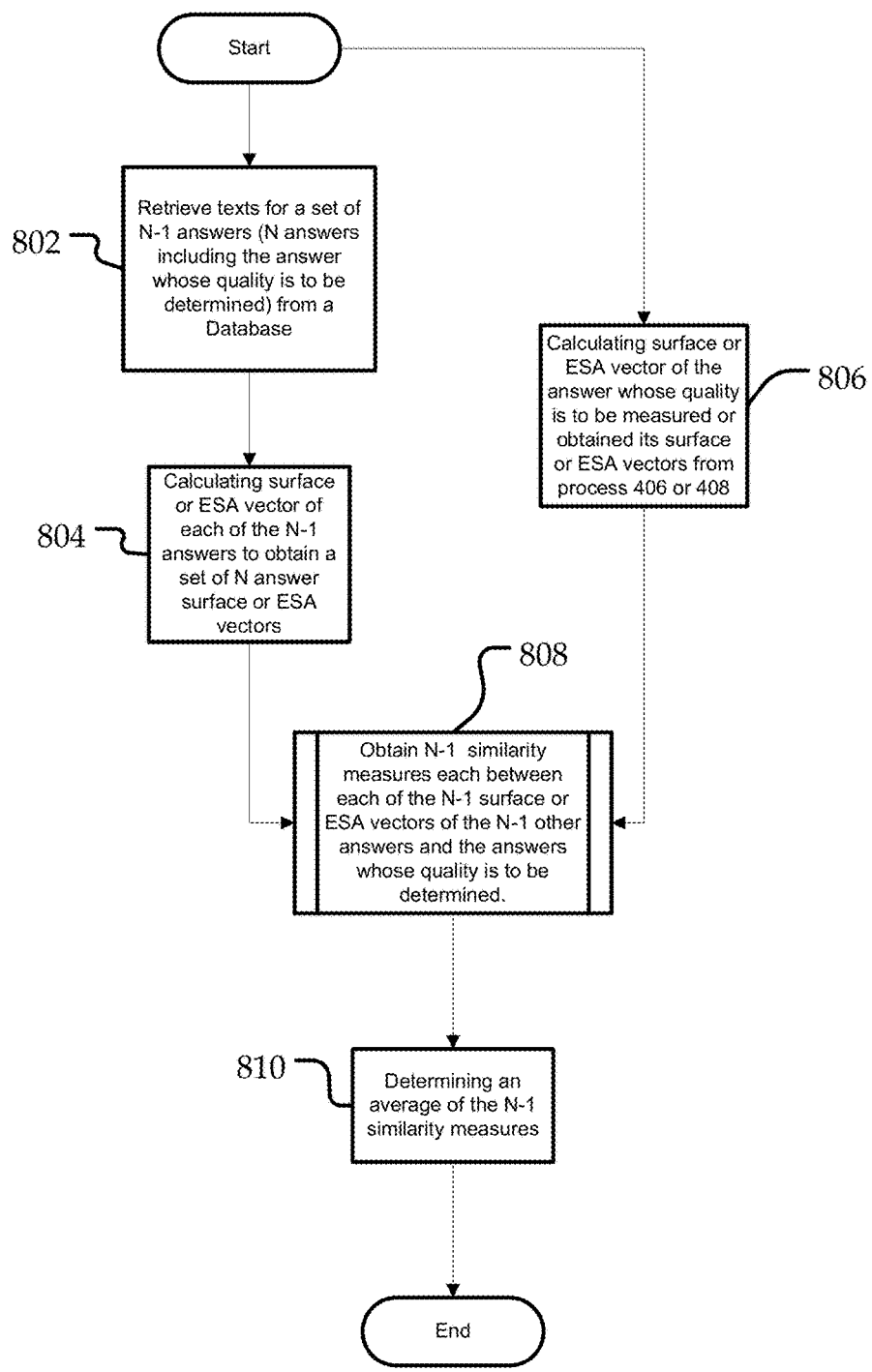
FIG. 8 shows a flow chart for determining answer-answer ESA similarity.

Referring again to FIG. 4, in the process indicated by block 410, an answer similarity is determined for the answer text. FIG. 8 shows an exemplary embodiment for determining the answer similarity. Specifically, because repeated recommendations or opinions in different answers would indicate that they represent more important relevant information or a more common view, answers with information that appears in other answers may be of higher quality. Thus, in block 802, a set of N−1 other answers for the question are retrieved. Surface word vector or alternatively ESA vector (as discussed above) of each answer in the set of N−1 answers is determined in block 804. The set of N−1 answers and the answer whose quality is to be measured make up a total of N answers representing all or a subset of available answers to the question. In block 806, the surface or ESA vector of the answer whose quality is to be determined is calculated. Alternatively, the surface or the ESA vectors of this answer may be obtained from process of block 406 or the process of block 408. In block 808, a set of N−1 similarities between each of the N−1 surface or ESA vectors and the surface or ESA vectors for the answer whose quality is to be measured is determined. These similarities may be calculated by computing the cosines between the surface or ESA vectors to obtain a set of N−1 cosines. In block 810, an average of the N−1 similarities (e.g., cosines) is determined to obtain the answer similarity, as a third measure of the quality of the answer text, representing the similarity of the answer to the other answers to the same question.

Figure 9:
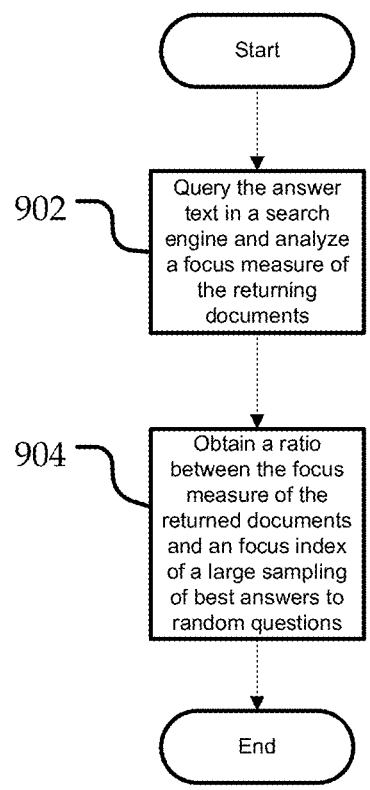
FIG. 9 shows a flow chart for determining query performance predictor.

Referring again to FIG. 4, in the process indicated by block 412, a query performance predictor is used for determining the fourth measure of the quality of the answer text. FIG. 9 illustrates an exemplary embodiment for determining the query performance predictor for the answer. Specifically, this measure is based on the assumption that the focus of an answer on a specific informative topic may be a good indicator that the answer provides useful and valuable information to the asker. The query performance predictor may be designed to measure whether a text is focused. For example, in block 902, the clarity and query feedback may be calculated as query performance predictors of the answer. In particular, the answer text is issued as a query to a search engine, such as the Lucene search engine. Clarity and query feedback may be calculated for the resulting documents returned for the answer from the search engine. In block 904, its ratio with an clarity and query feedback index of a random sample of a large sampling of question/best-answer pairs (e.g., 2 million pairs) may be determined as the fourth measure of the quality of the answer. At a high level, these measures look at the difference between the language model defined by the retrieved documents from the search engine and the language model of the general corpus (the 2 million question/best-answer documents). The more the retrieved language model differs from the general corpus, the more focused it is assumed to be.

Referring again to FIG. 4, in the process indicated by block 414, a sentiment analysis parameter is determined as the fifth measure of the quality of the answer text. This measure looks just at the wording rather than the content and assumes that empathic answers are appealing, while "flaming" text in an answer alienates the reader. An example for capturing this intuition is to use the SentiStrength tool to extract the positive, negative, and neutral sentiment levels of the answer.

Figure 10:
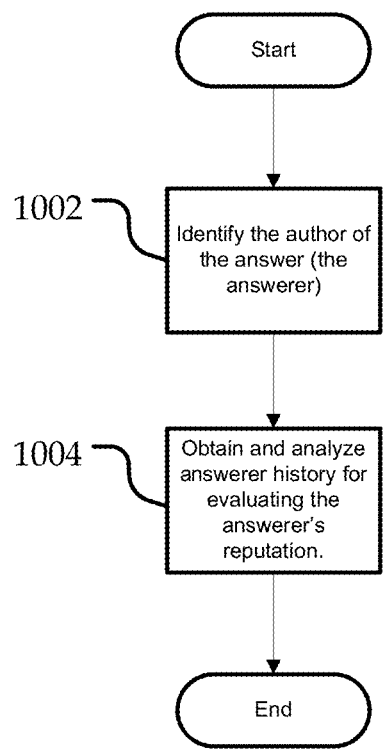
FIG. 10 shows a flow chart for determining answerer's reputation.

Referring again to FIG. 4, in the process indicated by block 416, reputation of the answerer is determined as the sixth measure of the quality of the answer text. FIG. 10 shows an exemplary embodiment for determining the answerer's reputation. Specifically, features that capture aspects of the answerer's reputation may be obtained as an indicator of her ability to generate high quality answers. In block 1002, the author of the answer is identified by, for example, looking up the answer database. In block 1004, history of the answerer, such as user voting, e.g., thumb-up and thumb-down voting, of past answers by the answerers (not necessarily to the question at issue) is retrieved from the database. The information is analyzed. For example, thumb-up count and thumb-down count for the answerer may be generated. In another example, count of best answers from the answerer or the ratio of best answer count and the total number answers may be obtained. Comments to the answerers' answers may be analyzed to provide a measure of answerer's reputation. Answerer's tenure on the site may also be obtained as an indicator of reputation. Some CQA site, such as Yahoo! Answers, may provide a point system for tracking user actions. Those points for the answer may be used as indication of reputation. The above factor may be considered in isolation or combination in arriving at an overall user reputation as the sixth measure of the quality of the answer provided by the answerer.

Referring again to FIG. 4, in the process indicated by block 418, a combination of textual characteristics of the answer is determined as the seventh quality measure. For example, writing style of the answerer in terms of word selection may be analyzed by counting the number of misspellings, stop words, abusive words, polite words, articles, pronouns and prepositions in the answer's text. Additionally, phrases that are common as short answers are counted as an indication of an answer bearing empty content. Some examples of common empty short phrases are "yes", "no", "idk", "sure" and "i think so". For each respective text style characteristics, a raw count may be obtained. Alternatively, they may be obtained as a ratio, and as a binary indicator (nonzero appearance count). As a further example, Another notion of answering style concerns overall text statistics such as answer length in raw character or word counts, the average word length, the percentage of punctuation marks, the percentage of capitalized sentences and capitalized words, and the number of hyperlinks in the answer. As another textual style, grammaticality may be approximated by a language model. For example, a trigram language model may be constructed for large number of (e.g., 1 million) best answers (all chosen by the respective askers) as a corpus of expected style of relevant answers (as viewed by the askers). The likelihood of the target answer text to the trigram model may be calculated as a measure of the grammaticality.

Referring again to FIG. 4, in the process indicated by block 420, user feedback may be used determined as the eighth measure of answer quality. The server may retrieve the user feedback given to the answer on site, including indicator features for best-answer, the number of thumbs up and thumbs down given to it, and the number of edits the answerer performed on the answer.

The individual measures of answer quality described above and other measures that may be incorporated into assessing the answer quality may be weighed to obtain an overall quality measure for the answer in an automatic quality scoring (AQS) algorithm. The relative weight of each individual measure may be determined through a learning process in which AQS produces a ranking for a large set of answers that approximately matches professional human raters. For example, a gold standard data-set for training and testing may be constructed by using professional human annotators (raters). The questions for answers labeled with high and low quality may be split into a training and a test sets.

The training set is then used as input to a classifier learner, under the well-known supervised learning framework. Under this framework, a set of training examples is presented to a model-fitting component ("learner"). Each example is composed of a vector of features (the determiners described above), and a target label ("high" and "low" from the raters above). The learner then computes values for various parameters which describe a classification system. For example, a decision-tree learner outputs a nested structure of if/else conditions, taking into account feature values of the example, and eventually ending in either "high" or "low" quality assessment. There are many classifier models in practice, including but not limited to: decision trees, logistic regression, SVM, k-nearest-neighbors, Gaussian mixture models, and others. There are also software packages available to explore and evaluate various classifiers and choose the one best suited for the task, such as Weka.

Standard classification algorithms based on, for example, Weka may be used. The best-performing logistic regression may be used as the classifier. The performance of the algorithm over the test-set may be measured by area under the ROC curve (AUC). This regressor may also have the useful property of generating a confidence value (the likelihood of a high-quality classification).

The algorithm may reveal the importance of the various individual quality measures discussed in FIG. 4. A pairwise cross-correlation analysis among the features may be provided by the learning algorithm or via preparatory analysis. Correlated feature may be deemed redundant and the redundancy may be removed. An exemplary analysis implemented within the online query system discussed above reveals that the most significant individual measures, in addition to user feedback, were a mix of answerer reputation, answer text, and question-answer similarity. More specifically, they included the answerer's absolute number of best answers; the answerer's tenure on the site (longer tenure was indicative of higher quality); the punctuation percentage in the answer text (more punctuation was indicative of higher quality, as it indicates a higher effort from the answerer); the match to the best answer language model; and the ESA similarity between the answer and the question. The pairwise cross-correlation analysis among the features indicates that there is no high correlation (above Pearson's r=0.4) between any pair of features. Moderate correlation was found between the ESA-based question similarity and answer similarity (r=0.39; p<0.001), the answerer's total number of best answers and the answerer's tenure on the site (r=0.23; p<0.001); and the ESA-based question similarity and the query performance predictor (r=0.22; p<0.001). None of the features was found to be correlated with the number of positive or negative thumbs in user voting. Overall, the features appear to be complementary and no obvious redundancy could be observed.

In one embodiment, answers for a question asked by a user are shown to the user in order of quality value determined by the AQS algorithm above. In an alternative embodiment, answers with scores below a threshold may be hidden from the view of the user. Specifically, let T be the top score for any answer on the page and assume that the score range is normalized between 0 and 1. Answers with core less than, for example, T−0.5 may be hidden from user view. The rational is that the lowest possible score that the user may tolerate depends on the overall quality of the answer set. If all answers are bad, then another bad one isn't worsening the experience by much. But if there are high-quality answers, then the bad ones ruin the user impression and experience. Those of ordinary skill in the art will understand that any other threshold relative to the top score T may be implemented for hiding low quality answers from user view. The threshold is dynamically set, depending on top score of the answers.

The exemplary AQS algorithm employed in one example was experimentally tested against rankings by two groups of users, each with their own respective degree of interest, attention span and knowledge. The first group includes the askers, who have a declared interest strong enough to have posted the question but possibly have little knowledge. The second group of users includes the site visitors more specifically those who voted for the answer (the crowd).

In a first experiment, the congruence between the algorithmic best quality answer, and the best answer as chosen by the asker is measured. For example, a set of over 100 million questions from Yahoo Answers, posted between 2005 and 2014 are analyzed. Of these, 34% contained best answer chosen by the asker. In 63% of the cases, the best answer by algorithmic quality was the same as the best answer chosen by the asker. Out of the remaining 37% of the cases, 500 questions were uniformly sampled and an editorial rating study was performed. The raters were presented with a question and two answers: the best answer chosen by asker and the best answer by the AQS algorithm, and were asked to decide whether one of the answers is better. Specifically, they were instructed to "read the question and both answers, decide which of the two answers is a better answer to the question, and check the corresponding check-box", where the available check-boxes were: "Answer 1", "Answer 2", "Both are good", and "Both are bad". In 46% of cases, both answers were of equal quality (40% both good and 6% both bad). AQS won in 37% of the cases (68% of non-tie cases) and best answer by asker in 17% of the cases. This difference is statistically significant at p<0.05 (Wilcoxon double-sided signed rank test).

In a second experiment, the congruence of the best quality answer by the AQS algorithm and the best answer judged by user feedback is measured. Users provide their feedback in Yahoo Answers by thumbing up or down a specific answer. The user feedback value for an answer is defined as the number of thumbs up minus the number of thumbs down. The dataset of over 100 million questions from Yahoo Answers above is used. Nearly 92% of the questions had at least one user feedback, but for over 99% of the questions, there were no more than 20 thumbs in total. Overall, in 29% of the questions, the best algorithmic quality answer agreed with the best answer by user feedback. This is a substantially lower portion than the agreement with the best answer by asker. For the remaining 71%, 500 questions out of this portion were sampled, stratifying by the number of thumbs, 100 questions for each of the following strata: up to 5 thumbs, 6-20 thumbs, 21-50 thumbs, 51-100 thumbs, and over 100 thumbs. While this stratification is far from representing the entire question dataset, it allowed for inspection of the influence of high number of votes. For each question, the answer with the best user feedback and the best algorithmic quality answer are extracted. Human raters are then asked to indicate if one of the two is better, or if both answers are of the same quality, as done in the first experiment. In 41% of cases, the answers were indicated to be of equal quality. In 30% of the cases (51% of non-ties), the best answer by AQS was chosen as better and in 29%, the best answer by user feedback was chosen as better, however this difference was not statistically significant. On the other hand, considering only questions with 20 thumbs or less (which, as mentioned, comprise over 99% of all questions in the corpus), the AQS best answer was significantly better than the user-rated one, chosen in 36% of the cases (57% of non-tie cases), compared to 27%, respectively (p<0.05, Wilcoxon double-sided signed-rank test).

Further experiments were conducted as in-vivo tests to study whether the algorithm serves the desired outcome when exposed to actual users of the site and whether it is beneficial in terms of user engagement.

The first user-engagement experiments focused on clicked answer position and was performed using A/B testing on live user traffic. A/B testing (sometimes referred to as "split testing" or "bucket testing") is an evaluation method that compares two variants, the "control" and the "treatment", through a controlled experiment, in which some users receive the control variant and others receive the treatment variant. It is currently the industry standard for evaluating website features on a large scale. For the control variant, answers for each question is ordered using user thumbs, promoting answers that had the biggest difference between the number of thumbs-up and thumbs-down. For the treatment version, the answers for each question are ordered using algorithmic quality. In addition, answers with score lower than a threshold, set to the top quality score minus a parameter called a, are hidden. Both variants using a specially instrumented version of the Yahoo Answers landing pages, described below, are measured.

The standard user interface (UI) includes a question page, where all of the answers are visible, but does not include any user controls that could be instrumented (e.g., clicks). This user interface is modified by truncating each answer text after 2 lines, and adding a teaser link labeled "show more". Clicking on the teaser link exposed the rest of the answer in-line. The metrics were computed based on clicks on the "show more" link, which provided a fine-grained measure of interest in each answer. As a basic metric, Click-Through Rate (CTR)—a standard way to measure the level of interest in the presented content—is used. Here, the CTR is measured as the ratio between the number of clicks on the "show more" link and the number of times it was presented. Statistically, one can view the impression-click relationship as a binomial process where the click-through rate reflects the probability p of a success (click) in a trial (impression). The maximum-likelihood estimate of p is then simply the number of observed successes (clicks on the "show more" link), divided by the number of trials, i.e., the number of times the link was shown. Higher values of CTR suggest higher user engagement.

To augment CTR, a Mean Reciprocal Rank (MRR) is also used, which measures how high in the list the click occurred (i.e., how highly ranked was the first answer that was expanded). More formally, MRR is defined as a multiplicative inverse of the rank of the first relevant result. The higher it is, the better, with the best case being MRR=1 (when the chosen result is at the top slot) and the worst case being MRR=0 (when no click occurs). MRR is commonly used in information retrieval for evaluating any process that produces a list of possible responses to a query. Here, the query is a posted question, the responses are the answers, and the first relevant result is the first clicked answer. Therefore, the more successful ranking of the answers would result in more clicks on the top answers and therefore a higher MRR.

The first user-engagement experiments were performed on live mobile user traffic over a period of two weeks. During this period, hundreds of thousands of page views were collected. In the default mobile UI, the question is presented on the top, followed by the best answer, and then the remaining answers, ordered by user feedback. The question page can contain a maximum of 5 answers and in order to see the other answers, a user needs to click the "next page" button. To perform the experiment, the standard UI was tweaked by (1) disabling the reserved slot for the best answer, and (2) truncating all the answers to a maximum of two lines with a teaser link, as previously explained. Answers too short to contain a teaser link (19% of all answers) were not counted as an impression and therefore excluded from the measurement. Also, impressions and clicks below position 5 were discarded as only a small percentage of the users used the "Next page" link. Obviously, short answers, along with low-quality hidden answers, change the number of alternatives for a user to click on and therefore affect the metrics. In order to ensure a fair comparison between control and treatment, all question page views were binned by the number of answers available for click, and the CTR and MRR for every bin were computed separately. Finally, both metrics were aggregated across bins.

In the first user engagement experiments, it was shown that the treatment variant outperformed the control variant by 9.2% in terms of CTR and by 3.8% in terms of MRR. Both results are statistically significant with $p<0.01$ using Hoeffding's bound. A simplified version of the treatment was also used, which only ranked the answers by their quality score but did not hide the low-quality ones. The performance of this variant was more modest with a 5.5% increase in CTR and a 2.8% increase in MRR, as compared to the control.

A second set of user engagement experiments were designed to investigate how users interact with answers of different quality, whether users spend more time reading higher quality answers, whether they view more answers if they are of higher quality, how deeply do they explore the content, and whether the depth of exploration depend on the quality.

In order to investigate how users view the content in the second user engagement experiment, a small fraction of page views on desktop in Yahoo Answers were instrumented to focused on users who arrive to the CQA content by referral from a search engine's result page (typically, these are not the original asker or answerers). For each page view in the sample, a dwell time (time on page from entry to exit) and scrolling (needed to expose more content) are tracked. In the desktop interface, the answers to a question are arranged vertically; the question and the best answer (if any) are shown at the top, as well as between 2 and 4 other answers, depending on answer length and screen resolution. The answers are arranged in order of decreasing AQS. To expose additional answers, if they exist, scrolling is required. Each scroll event as well as the maximum scroll depth (maximum pixel position of scroll marker) were recorded. The maximum scroll position was used as a rough proxy for the content the user was willing to explore, and dwell time was used as a proxy for the users' interest. To make the analysis more meaningful, the page views were split into those with "high" and "low" AQS of the top-ranked answer, as that is the one guaranteed to be available and likely to be examined by the users. The "high" threshold for AQS was chosen as the median AQS for all answers in the dataset, and the "low" threshold was set to the 25% lowest quantile of the answers in the data. Other thresholds were experimented with for sensitivity analysis, without noticeable change to the reported statistics.

The overall dataset and engagement statistics for the second user engagement experiments are summarized below. In the dataset, there were a considerably larger number of pages with high-quality scores for the top answer than with low-quality scores because only search-intent page views were considered, which privileged high-quality question-and-answer documents. Nevertheless, there was a substantial amount of page views for pages with low AQS of the top answer. The average dwell time on pages with high AQS was 261 seconds, more than a minute longer than for low AQS pages (158 seconds), suggesting that users are paying more attention to the higher quality content. Interestingly, the fraction of the time the users scroll to expose additional answers decreased for both high AQS (58% of page views) and low AQS (32% of page views). While users are almost twice as likely to explore additional answers when the top answer is of high quality, the reduction in scrolling compared to the rest of the page views is puzzling at first glance. This may be due to two different phenomena. In the case of high-quality AQS pages, reduction in scroll is likely due to searcher satisfaction: the searcher is more likely to be satisfied with the best, high-quality answer, and thus do not explore additional answers (hence, no scrolling is needed). In the case of low-quality AQS pages, the dramatic reduction in scrolling behavior is likely due to the different phenomena of the searcher abandoning the page, as the examined top answer is of poor quality, and the searcher does not expect to find additional good content lower down. These overall behavioral results obtained agree with the A/B testing and manual annotation findings described in the previous sections.

The scrolling behavior in further explored to study whether answers of higher quality lead users to explore the content in more depth, and how this changes with the number of available answers. It was found that the scroll depth is higher for pages with a larger number of total answers available, which serves as a "sanity check" of the data. More important is the difference within each data series. Consistently, the more answers with high-quality score presented, the more deeply users explored the page. For example, for pages with a total of 4 answers, users scrolled, on average, 475 pixels down when all the answers were of low quality, compared to 615 pixels on average when all 4 answers were of high quality, indicating the factor at play here is content quality, rather than quantity.

While the embodiments disclosed herein focus on CQA context, they may be applied to any information gathering and ranking. The importance of various quality measures discussed in this disclosure in other context may be determined and quantified using similar learning principles disclosed herein. In addition, user-generated content is personal, and subjective criteria for content quality may naturally vary for different users, or even for different information needs. Thus, personalizing both AQS curation and presentation techniques could further improve user engagement and satisfaction.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The invention claimed is:

1. A method for displaying answers to a question, comprising:
    acquiring a question text;
    retrieving N answer texts corresponding to N answers to the question, wherein N is an integer greater than one;
    computing a question vector representing an explicit semantic analysis vector for the question text;
    computing an explicit semantic analysis vector for each of the N answer texts to obtain N answer vectors;
    computing an overlap between the question vector and each of the N answer vectors to obtain a set of N measures of question-answer similarity each corresponding to a measure of similarity between the question vector and each of the N answer vectors;
    determining a quality score for each of the N answer texts and a quality ranking of the N answer texts based at least partially on the set of N measures of question-answer similarity; and
    displaying one or more of the N answer texts on a user interface in an order based on the quality ranking.

2. The method of claim 1, wherein an overlap between two explicit semantic analysis vectors is determined by computing the cosine of the two explicit semantic analysis vectors.

3. The method of claim 1, wherein retrieving N answer texts corresponding to N answers to the question comprises:
    querying a database containing question-answer pairs; and
    receiving, from the database, the N answer texts.

4. The method of claim 1, wherein retrieving N answer texts corresponding to N answers to the question comprises:
    querying an internet-based search engine using the question text; and
    receiving, from the search engine, the N answer texts.

5. The method of claim 1, further comprising:
    for each of the N answer texts, computing a corresponding subset of N−1 measures of answer-answer similarity each corresponding to an overlap between the answer vector of the each of the N answer texts and each of the other N−1 answer vectors; and
    calculating an average of the subset of N−1 measures of answer-answer similarity for each of the N answer text to obtain a set of N average measures of similarity each corresponding to a measure of similarity between each of the N answer vectors and the rest of the N−1 answer vectors,
    wherein the determining of a quality score for each of the N answer texts and a quality ranking of the answer texts is further based at least partially on the set of N average measures of similarity.

6. The method of claim 5, wherein the set of N measures of question-answer similarity are weighed more heavily than the set of N average measures of similarity in determining the quality score for each of the N answer texts and the ranking for the answer texts.

7. The method of claim 5, wherein the first set of N measures of question-answer similarity and the set of N average measures of similarity are weighed using a predetermined proportion in determining the quality score for each the N answer texts and the quality ranking of the answer texts.

8. The method of claim 5, wherein at least some of the set of N measures of question-answer similarity and at least some of the set of N average measures of similarity are combined to determine the quality score for each of the N answer texts in an automatic quality scoring process using a learning procedure comprising:
    constructing a gold standard classification of quality for a plurality of answers of a corresponding set of questions;
    fitting a model to best match the gold standard classification;
    comparing a quality classification of one or more answers from a plurality of classification algorithms to the gold standard classification; and
    choosing a best-performing classifier as a classifier for the automatic quality scoring process.

9. The method of claim 1, further comprising:
    using each of the N answer texts as a search term to query a search engine;
    receiving a set of documents from the search engine for each of the N answer texts;
    computing a first set of N general language models for the set of documents;
    using answer texts from a random question-best answer pairs as search terms to query the search engine and obtain a general corps of documents from the search engine;
    computing a second general language model of the general corps; and
    computing a difference between the second general language model and each of the first set of N general language models to obtain a set of N language model differences,
    wherein the determining of the quality score for each of the N answer texts and the quality ranking for the answer texts is further based at least partially on the set of N language model differences.

10. The method of claim 1, further comprising:
conducting a sentiment analysis of each of the N answer texts; and
obtaining a set of N sentiment levels each corresponding to a sentiment level of one of the N answer texts,
wherein the determining of the quality score for each of the N answer texts and the quality ranking for the N answer texts is further based at least partially on the set of N sentiment levels.

11. The method of claim 1, further comprising:
Identifying a highest quality score of the N answer texts,
wherein displaying one or more of the N answer texts on a user interface in an order based on the quality ranking comprises:
displaying, based on the quality ranking, one or more of the answer texts having at least one quality score higher than a threshold value derived from the highest quality score of the N answer texts.

12. A community question-answering server, comprising:
an input interface configured to acquire a question text from a user;
a database storing N answer texts to the question, wherein N is an integer greater than one;
a processing unit configured to:
retrieve the N answer texts;
compute a question vector representing an explicit semantic analysis vector for the question text;
compute an explicit semantic analysis vector for each of the N answer texts to obtain N answer vectors;
compute an overlap between the question vector and each of the N answer vectors to obtain a set of N measures of question-answer similarity each corresponding to a measure of similarity between the question vector and each of the N answer vectors; and
determine a quality score for each of the N answer texts and a quality ranking of the N answer texts based at least partially on the set of N measures of question-answer similarity; and
an output interface for causing a display of one or more of the N answer texts on a user device in an order based on the quality ranking.

13. The community question-answering server of claim 12, the processing unit is further configured to:
for each of the N answer texts, compute a corresponding subset of N−1 measures of similarity each corresponding to an overlap between the answer vector of the each of the N answer texts and each of the other N−1 answer vectors; and
calculate an average of the subset of N−1 measures of answer-answer similarity for each of the N answer text to obtain a set of N average measures of similarity each corresponding to a measure of similarity between each of the N answer vectors and the rest of the N−1 answer vectors,
wherein the determining of the quality score for each of the N answer texts and the ranking of the answer texts is further based at least partially on the set of N average measures of similarity.

14. The community question-answering server of claim 12, the processing unit is further configured to:
use each of the N answer text as a search term to query a search engine;
receive a set of documents from the search engine for each of the N answer texts;
compute a first set of N general language models for the set of documents;
use answer texts from a random question-best answer pairs as search terms to query the search engine and obtain a general corps of documents from the search engine;
compute a second general language model of the general corps; and
compute a difference between the second general language model and each of the first set of N general language models to obtain a set of N language model differences,
wherein the determining of the quality score for each of the N answer text and the quality ranking for the N answer texts is further based at least partially on the set of N language model differences.

15. The community question-answering server of claim 12, the processing unit is further configured to:
conduct a sentiment analysis of each of the N answer texts; and
obtain a set of N sentiment levels each corresponding to a sentiment level of one of the N answer texts,
wherein the determining of the quality score for each of the N answer texts and the quality ranking for the N answer texts is further based at least partially on the set of N sentiment levels.

16. The community question-answering server of claim 12, wherein the output interface is for causing the display, on the user device and based on the quality ranking, of one or more of the answer texts having at least one quality score higher than a threshold derived from a highest quality score among the N answer texts.

17. A non-transitory computer-readable storage medium having stored therein instructions that, when executed by a processor of a server, cause the server to:
acquire a question text;
retrieve N answer texts corresponding to N answers to the question text, wherein N is an integer greater than one;
compute a question vector representing an explicit semantic analysis vector for the question text;
compute an explicit semantic analysis vector for each of the N answer texts to obtain N answer vectors;
compute an overlap between the question vector and each of the N answer vectors to obtain a set of N measures of question-answer similarity each corresponding to a measure of similarity between the question vector and each of the N answer vectors;
determine a quality score for each of the N answer texts and a quality ranking of the N answer texts based at least partially on the set of N measures of question-answer similarity; and
display one or more of the N answer texts on a user interface in an order based on the quality ranking.

18. The non-transitory computer-readable storage medium of claim 17, when executed by the processor of the community question-answering server, further cause the server to:
for each of the N answer texts, compute a corresponding subset of N−1 measures of answer-answer similarity each corresponding to an overlap between the answer vector of the each of the N answer texts and each of the other N−1 answer vectors; and
calculate an average of the subset of N−1 measures of answer-answer similarity for each of the N answer text to obtain a set of N average measures of similarity each corresponding to a measure of similarity between each of the N answer vectors and the rest of the N−1 answer vectors, wherein to determine the quality score for each of the N answer texts and the quality ranking of the answer texts is further based at least partially on the set of N average measures of similarity.

19. The non-transitory computer-readable storage medium of claim 17, when executed by the processor of the community question-answering server, further cause the server to:

use each of the N answer texts as a search term to query a search engine;

receive a set of documents from the search engine for each of the N answer texts;

compute a first set of N general language models for the set of documents;

use answer texts from a random question-best answer pairs as search terms to query the search engine and obtain a general corps of documents from the search engine;

compute a second general language model of the general corps; and compute a difference between the second general language model and each of the first set of N general language models to obtain a set of N language model differences, wherein to determine the quality score for each of the N answer texts and the quality ranking for the N answer texts is further based at least partially on the set of N language model differences.

20. The non-transitory computer-readable storage medium of claim 17, when executed by the processor of the community question-answering server, further cause the server to:

conduct a sentiment analysis of each of the N answer texts; and obtain a set of N sentiment levels each corresponding to a sentiment level of one of the N answer texts, wherein to determine the quality score for each of the N answer texts and the quality ranking for the answer texts is further based at least partially on the set of N sentiment levels.

\* \* \* \* \*